United States Patent [19]

Boudy

[11] Patent Number: 4,471,616
[45] Date of Patent: Sep. 18, 1984

[54] DEVICE FOR REGULATING THE AIR SUPPLY OF AN INTERNAL COMBUSTION ENGINE

[75] Inventor: Jean-Pierre Boudy, Mennecy, France

[73] Assignee: Renault Sport, Viry-Chatillon, France

[21] Appl. No.: 405,190

[22] Filed: Aug. 4, 1982

[30] Foreign Application Priority Data

Mar. 29, 1982 [FR] France .................... 82 05293

[51] Int. Cl.³ .......................... F02B 37/00
[52] U.S. Cl. ...................... 60/611; 60/600; 415/160; 415/163
[58] Field of Search ............ 60/600, 601, 611; 415/163, 160

[56] References Cited
U.S. PATENT DOCUMENTS 2,427,136  9/1947  Hagen ........................ 415/160
3,049,865  8/1962  Drayer ........................ 60/611
3,059,415  10/1962  Birmann ..................... 60/611
3,208,213  9/1965  Anderson ................... 60/611
3,232,043  2/1966  Birmann ..................... 60/611
4,318,273  3/1982  Nohira ........................ 60/611

Primary Examiner—Douglas Hart
Attorney, Agent, or Firm—Oblon, Fisher, Spivak, McClelland & Maier

[57] ABSTRACT

In a device for regulating the air supply of an internal combustion engine supercharged by a turbo-compressor unit driven in rotation by the engine's exhaust, the intake of the rotating compressor is controlled by an intake regulation (or gating) system capable of reducing the compressive effect of the rotor of the compressor. Control elements of said regulation (or gating) system are connected with the accelerator linkage so as to close the regulation (or gating) system and reduce the compressive effect to the maximum degree when the accelerator moves toward the idling position of the engine.

7 Claims, 2 Drawing Figures

DEVICE FOR REGULATING THE AIR SUPPLY OF AN INTERNAL COMBUSTION ENGINE

BACKGROUND OF THE INVENTION

1. Field of the Invention

The present invention relates to a device for regulating the air supply of an internal combustion engine supercharged by a turbo-compressor unit rotatably driven by the engine's exhaust. The invention applies particularly to controlled ignition engines running on gasoline or other vaporizable fuel for which the intake of air at the entrance to the combustion chambers of the engine can be choked by a regulator element, such as one or more butterfly valves, controlled by an accelerator linkage located downstream from the compressor.

2. Description of the Prior Art

One drawback of this arrangement appears upon acceleration from idle. The turbo-compressor rotor is turning at a relatively low speed during idle. To regain speed requires several seconds of acceleration under the effect of the still limited exhaust flow of the engine. At the instant the turbo-compressor rotor first begins to pick up speed, the compressor rotor, which is turning at low speed, acts to create a pressure loss in the engine's air supply circuit, instead of delivering a pressure boost. This further reduces the flow of air taken in by the accelerating engine, even though the engine's air supply butterfly valve is fully open. It is only after a considerable increase in the speed of the turbine that the air supply pressure of the engine will exceed the atmospheric pressure and thus create an appreciable increase in the flow of exhaust gas, enabling rapid acceleration of the turbo-compressor rotor to its maximal speed and assuring a clear pressure boost to the engine.

SUMMARY OF THE INVENTION

One of the objects of the present invention is to reduce the response time in the acceleration of controlled ignition engines supercharged by turbo-compressor when their performance in changing speeds, and especially in reacceleration, is compared to the performance of similar non-turbocharged engines.

For this purpose, the intake of the rotating compressor is controlled by a regulator (or gating) system capable of reducing the compressive effect of the compressor rotor, with control of said regulator system being connected with the control of the accelerator linkage. The regulator system operates to reduce the compressive effect of the compressor to the maximum degree possible when the accelerator moves toward the idle position of the engine so as to cut the power consumed at this point by the compressor and to keep the rotor of the turbine-compressor unit at a high speed in order to reduce the time lag in the resumption of speed of said rotor when the engine regains speed, while allowing for a quick cut in the power of the engine by the intake regulator element of the engine. The regulation (or gating) system consists generally of a series of blades disposed within the annular supply passage of the compressor and arranged to pivot about an axis mechanically connected to the accelerator linkage. The blades can pivot between a position aligned in the direction of the radial air intake flow at full acceleration of the engine and a position which sets the air at the compressor intake into rotation in the direction which will reduce the delivery pressure of the compressor.

According to an embodiment of the invention, control of the regulator system is connected with the accelerator linkage by a mechanical linkage that senses the movement of the accelerator and an element for sensing the air pressure at the engine intake, downstream from the compressor. The element for sensing the air pressure prevents full opening of the regulator system as long as said air intake pressure into the engine is lower than a pre-set value corresponding to significant pressure boost. The mechanical linkage may comprise a cylinder barrel integral with an accelerator link and containing a piston connected mechanically to the regulator system control. The piston is controlled, on the one hand and in the open direction of the regulator system, by the air intake pressure at the entrance to the engine at a point downstream from the butterfly valves and, on the other hand, by the reactive force of a return spring and the atmospheric pressure or to the pressure at the compressor intake. Accordingly, the return spring will limit the opening of the regulator (or gating) system in the absence of a significant pressure boost at the engine intake and increasing pressure boosts at the engine intake will cause the regulator (or gating) system to open progressively until the blades are fully open.

According to one method of controlling the sytem of the invention, with the engine at idle the air choking element controlled by the accelerator linkage is set to shut the air intake to the engine only partially, while the accelerator/regulator (gating) system control connection is set to induce a substantial closing of the gating so as to enable the compressor rotor to turn at relatively high speed while the engine is at idle, a time when the intake pressure-loss across the compressor usually occurs.

According to another aspect of controlling the air regulation system of the invention, with the engine at idle, the connection of the accelerator linkage with the regulator system (consisting of a series of blades disposed in the annular supply passage of the compressor) is set up to produce a powerful rotation of air at the compressor intake in the direction of the rotational drive of the rotor of said compressor so as to drive in rotation, at least partially, the compressor rotor, and thereby to enable this rotor to turn more quickly while the engine is at idle, while at the same time forming together with the regulator element an intake pressure loss capable of choking the engine's air intake consistent with operation at idle or at low speeds.

The air supply regulation means of the invention are particularly applicable to controlled ignition engines, which present difficulties in the adaptation of the supercharging turbo-compressor to the intake speed, with choking of the air flow at the intake of the engine being provided either directly, as with fuel injection, or through a carburetor. With diesel engines, air suction is restricted only by the pressure losses in the intake circuit, which is always wide open, and the engine always has a significant exhaust pressure available to it, thus ensuring a high minimum speed of rotation of the turbo-compressor rotor. By contrast, with controlled ignition engines, the intake pressure may, through choking at the carburetor, become very low (with values lower than 0.2 bars) and yield post-expansion exhaust pressures which are barely greater than the atmospheric pressure (although combustion pressure is nevertheless much greater than the atmospheric pressure in order to turn the engine over). In this case, the pressure will no longer even spin the rotor of the turbo-compressor.

The device of the invention enables the turbo rotor to rotate at relatively high speed even with the engine at idle by increasing the exhaust pressure and using a portion of the suction power of the engine to cause the rotor to act as turbine under the effect of the engine's suction-induced low pressure. Such a system has the risk of increasing fuel consumption slightly at idle, but it greatly improves the engine's smoothness and efficiency in operation.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views, and wherein.

DETAILED DESCRIPTION OF THE PREFERRED EMBODIMENTS

Figure 1:
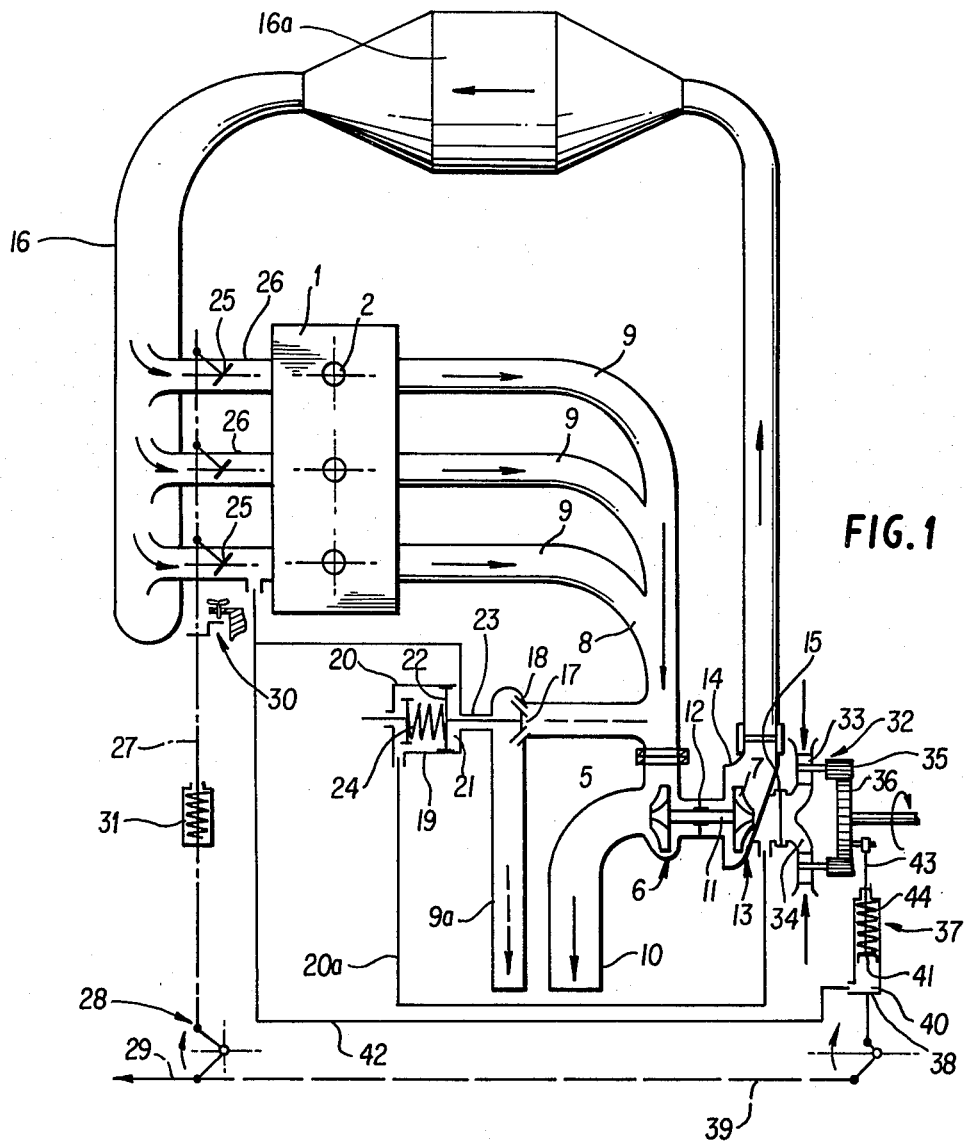
FIG. 1 shows a schematic section of the air regulation and supply means of a controlled ignition engine equipped with a turbo-compressor driven by the engine's exhaust and regulated in accordance with the invention.

According to FIG. 1, an engine 1 with three cylinders 2, 3 and 4, is equipped with an air turbocharging unit consisting of a centrifugal turbine 6 of which the rotor 5, housed within a volute housing, is placed in the path of the exhaust gas from turbine intake pipe 8 connected to engine exhaust pipes 9 which are in turn connected directly to the exhaust valve outlets of the engine. The intake of turbine 6 is tangential and the centripetal flow of the exhaust gas leads to an axial outlet connected to an exhaust pipe 10. Turbine rotor 5 is connected by a shaft 11, journalled on bearing 12 (generally lubricated by the engine's oil pressure), to a rotor 7 of a compressor 13 housed in a volute housing 14 and connected by an intake pipe 15 to air intake in the form of a regulating distributor 32.

Compressor rotor 7, rotatably driven by turbine rotor 5, takes in the engine combustion air axially and compresses it radially in a centrifugal flow toward an intake collector 16 which leads into the intake valves of cylinders 2 through 4, after cooling in heat exchanger 16a.

In order to limit the intake pressure within collector 16 and the combustion chambers of cylinders 2-4 and, consequently, the maximum combustion pressure exerted on the pistons of the engine, in the case of a diesel engine, and alternatively, the risk of knock in a controlled ignition engine, the circuit of turbine 6 is equipped with a bypass circuit consisting of a discharge valve 17 lodged within conical seat 18. By moving away from seat 18, valve 17 opens an annular passage which enables exhaust gas to be discharged directly from exhaust pipes 9 into a discharge pipe 9a, thus short-circuiting the blades of rotor 5 of turbine 6. The flow of exhaust gas across turbine 6 is thus reduced, considerably diminishing the speed of rotation of rotors 5 and 7 and, consequently, the delivery pressure of compressor 13 into intake collector 16.

The air pressure within intake collector 16 may be regulated with the aid of a regulator element 19 comprising two chambers 20 and 21 separated by a piston 22, generally of the membrane type in order to obtain a perfect seal with low operating hysteresis. Chamber 21 is connected to intake collector 16 downstream from compressor 13 and the pressure of the supercharged air prevailing in chamber 21 acts upon piston 22, connected by rod 23 to discharge valve 17, in opposition to a spiral spring 24 lodged within chamber 20. When the pressure in collector 16 downstream from compressor 13 and acting upon piston 22 exceeds the calibration of spring 24, valve 17 moves away from its seat 18 and a flow of gas is released directly into pipe 9a, which reduces the speed of the rotors of turbine 5 and compressor 7 and immediately stabilizes the supercharging pressure within intake collector 16. The chamber 20 is in contact with the atmosphere, or the intake collector of compressor 13 through a pipe 20a in which case the pressure in chambers 20 can be brought down to a pressure lower than the atmospheric pressure.

Additional air intake regulation elements are provided according to the invention to ensure (when engine 1 is of the controlled ignition type) maximum speed of rotation of turbo-compressor rotor elements 5, 11, 7 when the engine is running at idle or at low speeds.

These additional elements comprise a butterfly valve 25 at the mouth of each intake pipe 26 of cylinders 2-4 of engine 1. These butterfly valves are activated by a linkage 27 connected by a set of levers 28 to an automatic or manual control such as an accelerator pedal linkage 29. An adjustable stop 30 is inserted in linkage 27 to prevent butterfly valves 25 from closing completely. An elastic device, such as a spring cup 31 inserted in linkage 27, enables levers 28 to continue their rotation when valves 25 are stopped partially open or closed against stop 30.

According to the invention, air drawn in by compressor 13 crosses a pre-rotation distributor 32, the movable blades 33 of which are disposed within an annular intake passage 34 and rotate about axes 35. Axes 35 of distributor 32 are connected by a regulator (or gating) ring 36 controlled by a mechanical-pneumatic activator cylinder 37. The regulator ring 36 is connected as by gearing to the axes 35 such that rotation of the ring 36 causes the blades 33 to pivot from an open radial position which permits radial inflow of air into passage 34 to an oblique partially closed position which causes the inflow of air into passage 34 to rotate. The barrel 38 of cylinder 37 is mechanically connected through linkage 39 to levers 28 for movement with levers 28, while an inner chamber 40 of cylinder 38, occupied by a piston 41, is connected through tube 42 to one of intake pipes 26 downstream from a corresponding butterfly valve 25. Piston 41 is connected by its rod 43 to regulator (or gating) ring 36 and is drawn toward the bottom of cylinder barrel 37 by a return spring 44.

The operation of the regulation device of the invention will now be explained.

When engine 1 is under full load, butterfly valves 25 at the entrance to the engine are wide open, as are blades 33, which are pushed into open position both by the movement of the linkage 39 and by the supercharging pressure brought through tube 42 into chamber 40 of cylinder 37, which pressure acts upon piston 41 against spring 44 to move the rod 43 out of the cylinder.

The supercharging pressure is limited to a maximum value possible without causing knocking in the engine 1. The pressure is limited by valve 17, which opens when the pressure in collector 16 exceeds the calibration pressure of spring 24.

When the driver of the vehicle equipped with engine 1 suddenly raises his foot from the accelerator to close the linkage 29, butterfly valves 25 are suddenly pushed into a partially closed position, the pressure in tube 42 drops suddenly, and cylinder 37 draws the rod 43 inward and the regulator (or gating) ring 36 toward its closed position, thereby folding blades 33 very sharply and setting the intake air into rotation about the axis of compressor rotor 7 and in the direction of rotation of said compressor rotor, which then functions partially as a turbine under the suction effect of engine 1.

The pressure loss caused by the operation of compressor 13 as a turbine causes the flow of air at the intake of engine 1 to drop rapidly, causing engine compression drag and possibly a slow-down to idling speed. The speed of rotor elements 5, 11 and 7 of the turbocompressor diminishes in a limited way, particularly when the engine compression is creating a drag effect on the vehicle, and in any case the drop in turbo rotor speed is much less rapid than if the compressor intake were not subjected to regulation (gating) by the folded blades.

The regulator (gating) of distributor 32 closes as the pressure in chamber 40 of cylinder 38 drops, with the lowest pressure being obtained when the engine compression is exerting drag on the vehicle. The rotors of compressor 7 and turbine 5 then operate to choke the intake and exhaust respectively in order to obtain the maximum retention torque over the engine.

Figure 2:
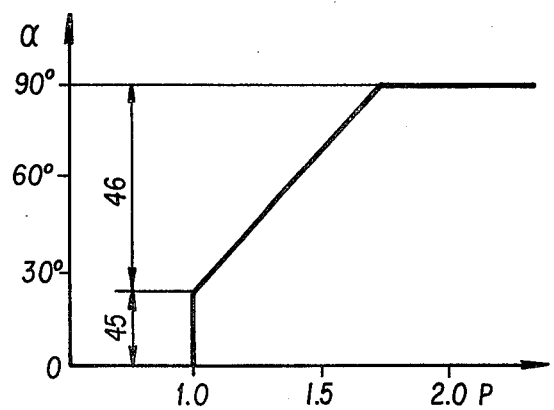
FIG. 2 is a graph illustrating pressure P obtained at the intake of the engine as a function of the angle of rotation of the series of blades disposed at the compressor intake.

The most spectacular results of the device of the invention are obtained upon reacceleration of the engine, e.g., in coming out of a turn after a phase in which the engine has exerted drag on the vehicle. The rotor of the turbo-compressor, driven by the suction of the motor acting upon compressor rotor 7 and the exhaust gas acting upon turbine rotor 5, is still turning at relatively high speed. Upon the resumption of acceleration, butterfly valves 25 at the mouth of the intake pipes are opened wide but the pressure boost in collector 16 does not exist. Cylinder 37, by mechanical control through linkage 39 alone, then causes a slight opening of blades 33 towards the radial direction. This is represented in zone 45 of the graph in FIG. 2 in which P is the pressure sensed by chamber 40 and α is the blade angle, with 90° being a fully open position. At this moment, rotor 7 of compressor 13 is slightly braked by the flow of air drawn through the compressor by the engine, while turbine rotor 5 is accelerated by the exhaust gas already being delivered at a high rate. Turbo rotor 5, 11, 7 accelerates very rapidly and remains at a high speed while, under the effect of the pressure rise in collector 16 and in chamber 40 of cylinder 37, blades 33 move progressively into zone 46 of FIG. 2, i.e., into radial position to allow for full compression pressure at compressor 13. The increase in engine power is much more rapid than with systems providing direct air supply to the compressor without the intake air being set into rotation and the power consumed at the compressor before the effective rise in pressure in the intake collector is reduced. This property is all the more valuable since the presence of heat exchanger 16a, acting as a cooling unit, increases the volume of air stored between compressor 13 and the cylinder inlet ports, as well as increasing the pressure loss between compressor 13 and cylinders 2-4. It must also be noted that heat exchanger 16a, particularly an air/water exchanger, may also serve to reheat air admitted to the cylinders after said air has undergone a marked drop in pressure and temperature due to expansion through compressor rotor 7 (operating as a turbine). In such a situation, turbine rotor 5 may operate as an exhaust gas removal pump driven by compressor rotor 7 playing the role of a turbine.

When the engine is running at steady, middle-range power, butterfly valves 25 of the engine are set in nearly fully open position, but the blades 33 of distributor 32 do not move into a fully open radial position, since the linkage 39 can not yet pull them into such a position (which is reserved for occasions in which the engine is at full power). The slight rotation of air at the intake of compressor rotor 7 enables the rotor to reach a speed of rotation which may be greater than its nominal speed under full load. This arrangement shortens the response time of the motor upon full acceleration, as needed, for example, when passing another vehicle.

The power regulation device of the invention, for a controlled ignition engine having a turbo-compressor, provides numerous advantages over the prior art. Among these benefits may be cited:

1. Better proportioning of air flow and engine power by the intake valves of the cylinders, resulting in increased smoothness of the engine.

2. Reduced response time when decelerating and, especially, when reaccelerating, particularly from a partially open position, or from a position in which the engine has been exerting compression.

3. Better opportunities for proportioning the air/gas mixture by using angle of opening of the cylinder intake valves as a parameter, i.e., in using a classic carburetor.

4. Better control of the speed of the turbo-compressor which, in case of prolonged operation at idle, no longer risks stopping.

5. Better engine-braking (drag) effect.

The engine intake butterfly valves may be replaced by drop-gates or any other valve-gate regulator device. The movable blade distributor 32 may be replaced by any other device capable of inducing prerotation which can be varied as a function of opening angle, such as a grill of turbojet blades.

The mechanical and pneumatic controls of the variable prerotation distributor 32 could also be replaced by other devices which take into account the air flow of the engine, particularly electronic means using the following as parameters: the speed of the engine; intake pressure, exhaust pressure, intake temperature, the opening angle of the engine intake butterfly valves and the speed of rotation of the turbo-compressor.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A device for regulating the air supply of an internal combustion engine supercharged by a turbo-compressor unit driven by engine exhaust and including a compressor, a compressor air intake and a turbine, said engine including air flow control means in an air flow path between said turbo-compressor and the cylinders of said engine, said engine further including accelerator linkage connected to said air flow control means, said device for regulating comprising means in said compressor intake and connected to said accelerator linkage for adjusting the compressive effect of said compressor wherein said means for adjusting are constructed and adapted to reduce said compressive effect as said accelerator linkage moves towards an idle position, wherein said means for adjusting includes means for sensing the fluid pressure in said air flow path downstream from said air flow control means and means responsive to said means for sensing, said means responsive to said means for sensing operating upon said compressor air intake.

2. The device of claim 1 wherein said air flow control means comprise butterfly valves.

3. A device for regulating the air supply of an internal combustion engine supercharged by a turbo-compressor unit driven by engine exhaust and including a compressor, a compressor air intake and a turbine, said engine including air flow control means in an air flow path between said turbo-compressor and the cylinders of said engine, said engine further including accelerator linkage connected to said air flow control means, said device for regulating comprising means in said compressor intake and connected to said accelerator linkage for adjusting the compressive effect of said compressor wherein said means for adjusting are constructed and adapted to reduce said compressive effect as said accelerator linkage moves towards an idle position, wherein said compressor air intake includes an annular portion and said means for adjusting comprise:

a circumferentially spaced plurality of blades in said annular portion, each of said blades being pivoted on an axis parallel to the axis of said annular portion whereby each of said blades may be pivoted between a radial position and a circumferential position;

blade pivoting means connected to said accelerator linkage for pivoting said blades about said axes, wherein said blade pivoting means comprise:

a cylinder fixed to said linkage;

a piston in said cylinder and fixed to a blade pivoting control element connected between said axes and said piston for pivoting said blades in response to the movement of said piston;

means communicating a first portion of the interior of said cylinder on one side of said piston with the fluid pressure in said air flow path downstream from said air flow control means; and spring means in a second portion of said interior on the other side of said piston.

4. The device of claim 1 including means for supplying atmospheric pressure to said second portion.

5. The device of claim 1 including means for supplying the fluid pressure in said compressor air intake to said second portion.

6. The device of claim 1 wherein said air flow control means comprise butterfly valves.

7. A method for regulating the air supply of an internal combustion engine supercharged by a turbo-compressor unit driven by engine exhaust and including a compressor, a compressor air intake having an annular portion, and a turbine, said engine including air flow control means in an air flow path between said turbo-compressor and the cylinders of said engine, said engine further including accelerator linkage connected to said air flow control means, said method comprising:

providing on said annular portion a plurality of blades pivotable about an axis parallel with the axis of said annular portion;

providing blade pivot control means responsive to said accelerator linkage and the fluid pressure in said air flow path downstream from said air flow control means; and arranging said blade pivot control means such that when said engine is idling, said blades are pivoted towards an oblique alignment relative to said annular portion axis such that inflowing air is rotated in the direction of rotation of said compressor and helps drive said compressor while increasing intake pressure loss.

* * * * *